United States Patent
Hornbeek et al.

(10) Patent No.: US 9,729,708 B2
(45) Date of Patent: Aug. 8, 2017

(54) METHODS AND SYSTEMS FOR ALTERING FEATURES OF MOBILE DEVICES

(71) Applicant: Disney Enterprises, Inc., Burbank, CA (US)

(72) Inventors: Stephen Hornbeek, Los Angeles, CA (US); Melissa Martyn, Long Beach, CA (US); Roxana Powell, Glendale, CA (US); Tracy Thurman, Torrance, CA (US); Courtney Watkinson, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/828,386

(22) Filed: Aug. 17, 2015

(65) Prior Publication Data

US 2017/0054844 A1 Feb. 23, 2017

(51) Int. Cl.
*H04M 3/00* (2006.01)
*H04M 3/42* (2006.01)
*H04W 4/00* (2009.01)

(52) U.S. Cl.
CPC ... *H04M 3/42153* (2013.01); *H04M 3/42042* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 6,721,545 | B2* | 4/2004 | Doi | H04M 1/0283 379/433.01 |
| 9,269,037 | B2* | 2/2016 | Adelman | G06K 19/0723 |
| 9,308,466 | B2* | 4/2016 | Akavia | A63H 3/36 |
| 2004/0044774 | A1* | 3/2004 | Mangalik | H04L 67/2819 709/227 |
| 2011/0028093 | A1* | 2/2011 | Patel | H04B 17/27 455/41.2 |
| 2012/0178431 | A1* | 7/2012 | Gold | H04M 1/7253 455/420 |
| 2012/0194457 | A1* | 8/2012 | Cannon | G06F 3/011 345/173 |
| 2014/0187289 | A1* | 7/2014 | Cataldo | H05K 13/00 455/557 |
| 2015/0049056 | A1* | 2/2015 | Post | G06F 3/046 345/174 |
| 2015/0116094 | A1* | 4/2015 | Fujioka | G06K 7/10009 340/10.5 |

\* cited by examiner

*Primary Examiner* — Shantell L Heiber
(74) *Attorney, Agent, or Firm* — Farjami & Farjami LLP

(57) ABSTRACT

There is provided a method for altering features of a mobile device. The method includes detecting a charm having a charm identification, obtaining the charm identification from the charm, identifying the charm using the charm identification, altering a theme of the mobile device to a new theme based on the charm, in response to the identifying of the charm.

20 Claims, 10 Drawing Sheets

510

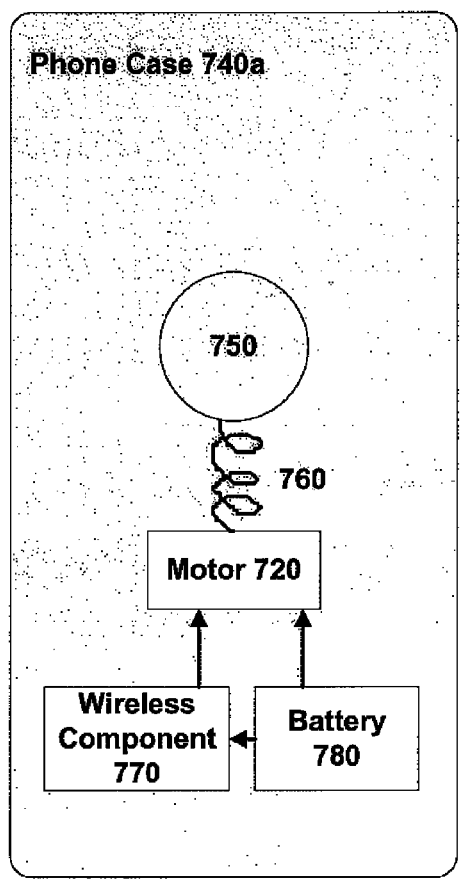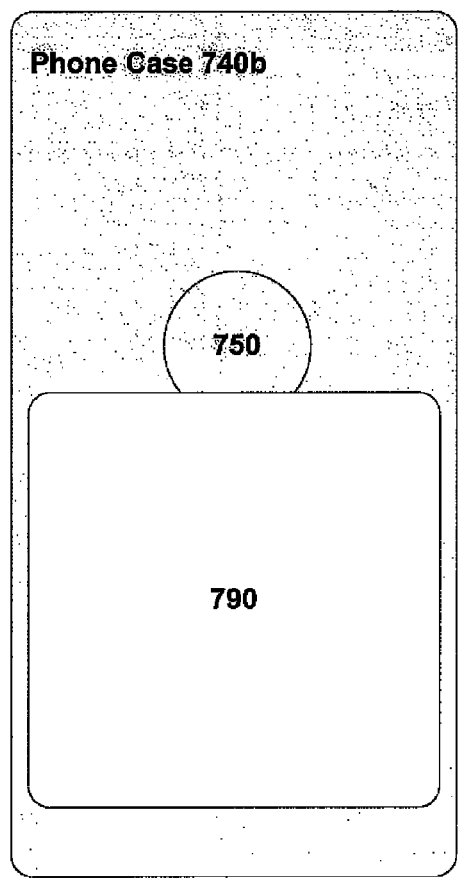
FIG. 7a  FIG. 7b

METHODS AND SYSTEMS FOR ALTERING FEATURES OF MOBILE DEVICES

BACKGROUND

The use of mobile devices continues to gain popularity among various age groups, especially the younger generation. Mobile devices are now used for a variety of purposes including gaming, social networking, and using various mobile applications as well as more traditional tasks such as making phone calls, communicating via text messages, and sending and receiving emails. As a result, nowadays, users spend a significant amount of time on their mobile devices. This has led to a desire by users, especially teenagers and children, to personalize various features of their mobile devices, and to have customized cases for covering and protecting their mobile devices.

SUMMARY

The present disclosure is directed to methods and systems for altering features of mobile devices, substantially as shown in and/or described in connection with at least one of the figures, as set forth more completely in the claims.

BRIEF DESCRIPTION OF THE DRAWINGS

FIG. 7a illustrates an exemplary mobile device and a mobile device case having a moving element, according to one implementation of the present disclosure;

FIG. 7b illustrates an exemplary mobile device and a mobile device case having a moving element, according to one implementation of the present disclosure;

DETAILED DESCRIPTION

Figure 1:
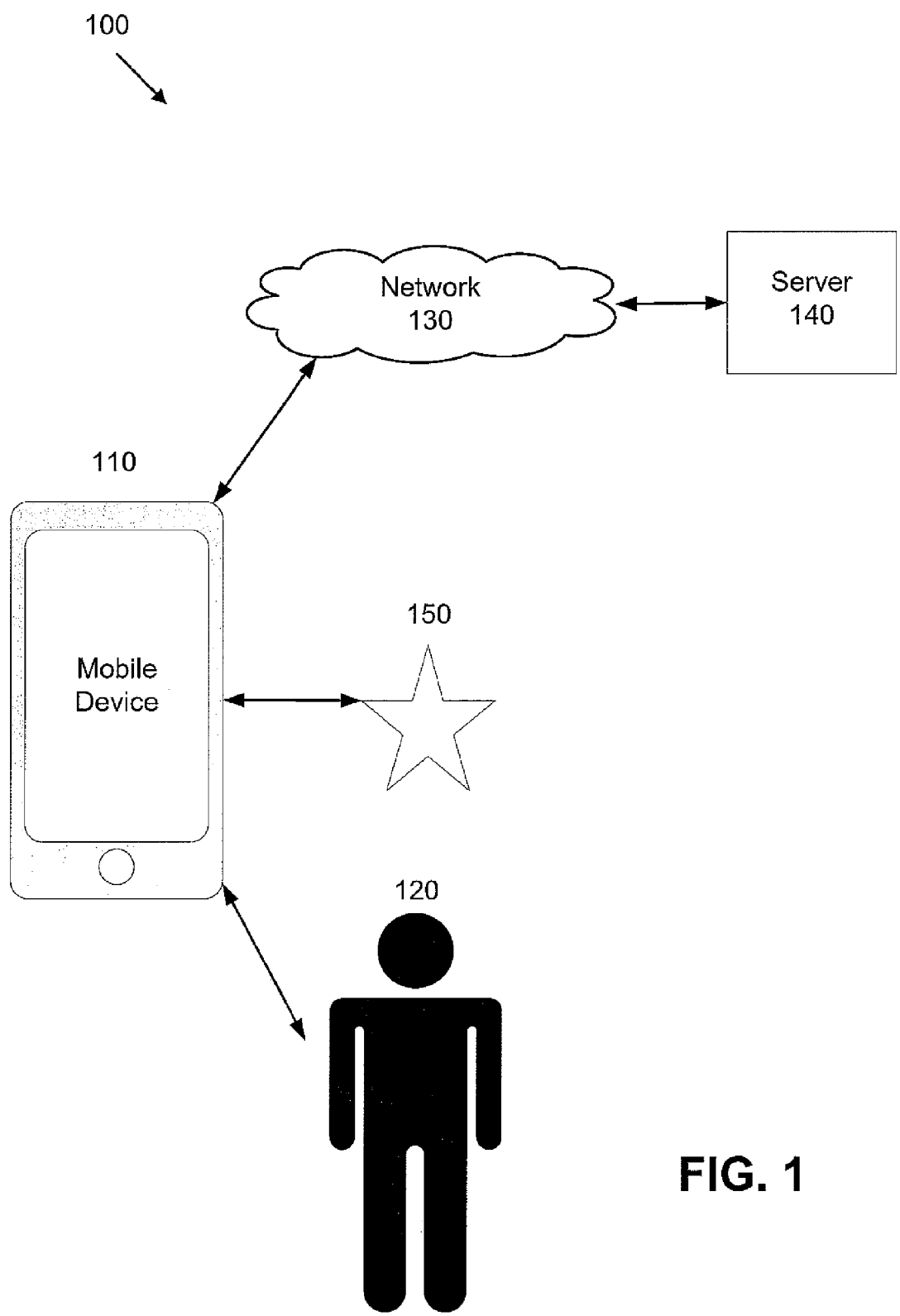
FIG. 1 illustrates an exemplary system for using a charm to alter features of a mobile device, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates exemplary system 100 for using charm 150 to alter features of mobile device 110, according to one implementation of the present disclosure. As shown in FIG. 1, system 100 includes mobile device 110, charm 150, network 130 and server 140, as well as user 120 who interacts with system 100.

Mobile device 110 may be any mobile computing device, such as a mobile phone, a tablet, a notebook, etc. As shown in FIG. 1, user 120 may utilize mobile device 110, for example by accessing, viewing, and interacting with mobile device 110. Mobile device 110 may also be in communication with server 140 over network 130 to send and receive information. Mobile device 110 is further capable of detecting charm 150.

Charm 150 may correspond to any physical object with an embedded wireless component 254, capable of communicating wireless signals to mobile device 110. In one implementation, charm 250 may be a small toy portraying characters and objects of motion pictures or games. For instance, charm 250 may be a small-sized toy or object in the form of a dog, cat, human, shoe, star, etc. Charm 250 may also be a customizable toy, such as a character with accessories, where each accessory may also be a charm. In another implementation, charm 250 may be a piece of jewelry such as a bracelet, necklace, ring, earrings or other wearable objects such as sunglasses, a watch, a headband etc. Charm 250 may also correspond to a small piece of jewelry that can be attached to a bracelet, necklace, ring or earrings.

Network 130 may correspond to a communication network connection, such as a wireless communication network, broadband communication network, or other communication networks. Server 140 is a computing device suitable for storing and providing digital assets or other content to mobile device 110.

Figure 2:
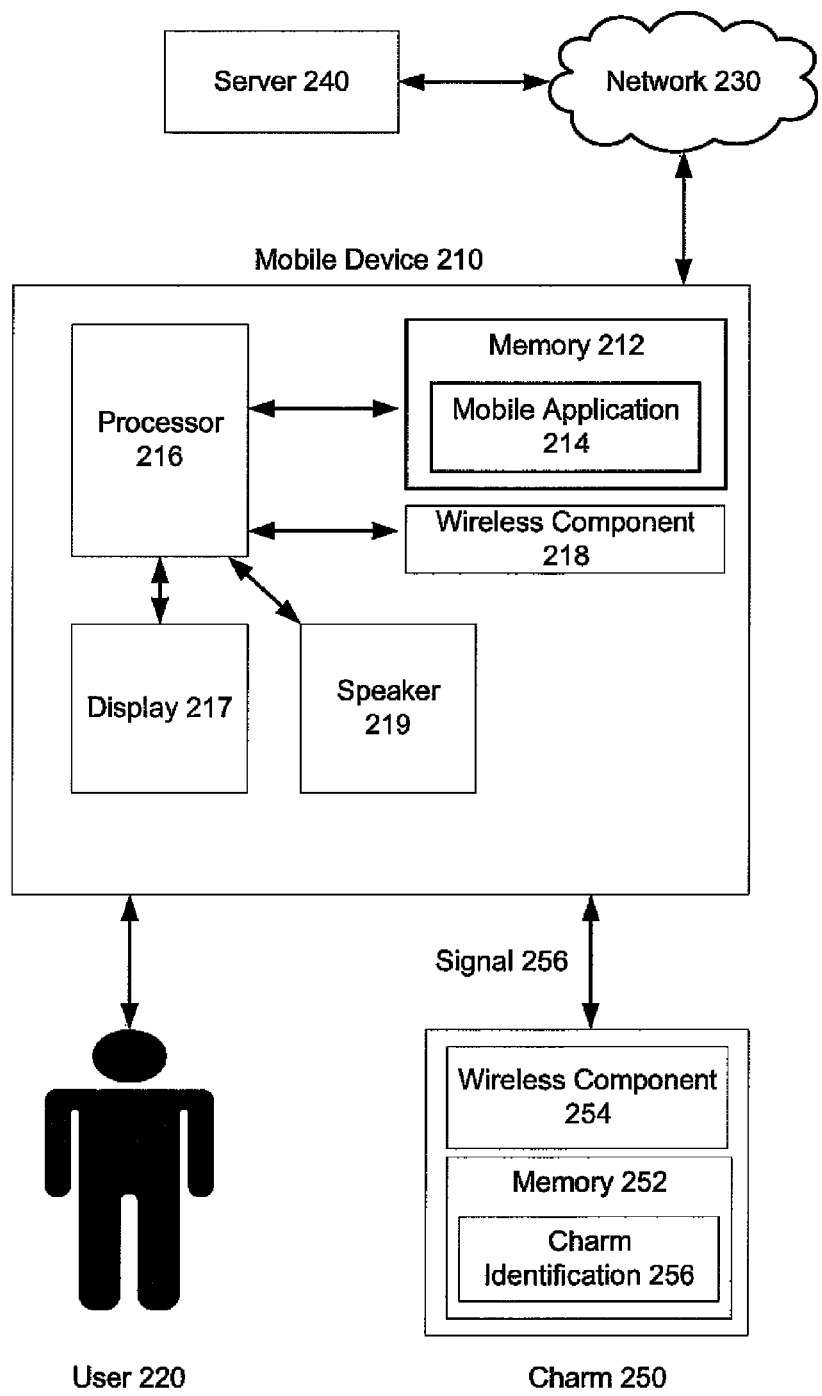
FIG. 2 illustrates a more detailed diagram of the system of FIG. 1, according to one implementation of the present disclosure.

FIG. 2 illustrates a more detailed diagram of system 100 of FIG. 1, according to one implementation of the present disclosure. As shown in FIG. 2, mobile device 210 includes processor 216, memory 212, wireless component 218, display 217, and speaker 219. Processor 216 may be a microprocessor or a similar hardware processor used in a computing device. According to FIG. 2, processor 216 may access memory 212 to store received input or to execute commands, processes, or programs stored in memory 212. Memory 212 is a non-transitory hardware storage device capable of storing commands, processes, and programs for execution by processor 216.

As shown in FIG. 2, memory 212 stores mobile application 214, which may be used by processor 216 to detect and identify charm 250. Mobile application 214 may also be used by processor 216 to present a user interface on display 217 for a user to interact with mobile device 210. Mobile application 214 may also include digital assets for altering various features of mobile device 210. In some implementations, mobile application 214 may be a gaming, a social networking, a text messaging, a content sharing application. Wireless component 218 may include a wireless transceiver capable of actively searching for and receiving wireless signals from charm 250 as well as transmitting wireless signals to charm 250. Display 217 may be any hardware display of a mobile device such as a tablet computer display, a notebook computer display, or a display of a smart phone for displaying a user interface of mobile application 214. Speaker 219 may include a mobile device speaker used by processor 216 to play ring tones or other sound effects.

Moving on to charm 250, charm 250 may include wireless component 254 and memory 252. Wireless component 254 may be any suitable wireless device for communicating with mobile device 210. In one implementation, wireless component 254 may be a radio frequency transmitter, such as an active or passive radio frequency identification (RFID) transmitter. In another implementation, wireless component 254 may be a near field communication (NFC) transmitter, or a short distance radio transmitter. In yet another implementation, wireless component 254 may be a transceiver capable of receiving and transmitting wireless signals. For instance, wireless component 254 may correspond to a transceiver capable of actively searching for and receiving wireless signals from mobile device 210 as well as transmitting wireless signals to mobile device 210.

Charm 250 may further include memory 252. Memory 252 is a non-transitory hardware storage device capable of storing commands, processes, and programs. Memory 252 stores charm identification 256. Charm identification 256 may be a unique identification number that is sent to wireless component 218 of mobile device 210 for mobile application 214 to identify charm 250.

Figure 3:
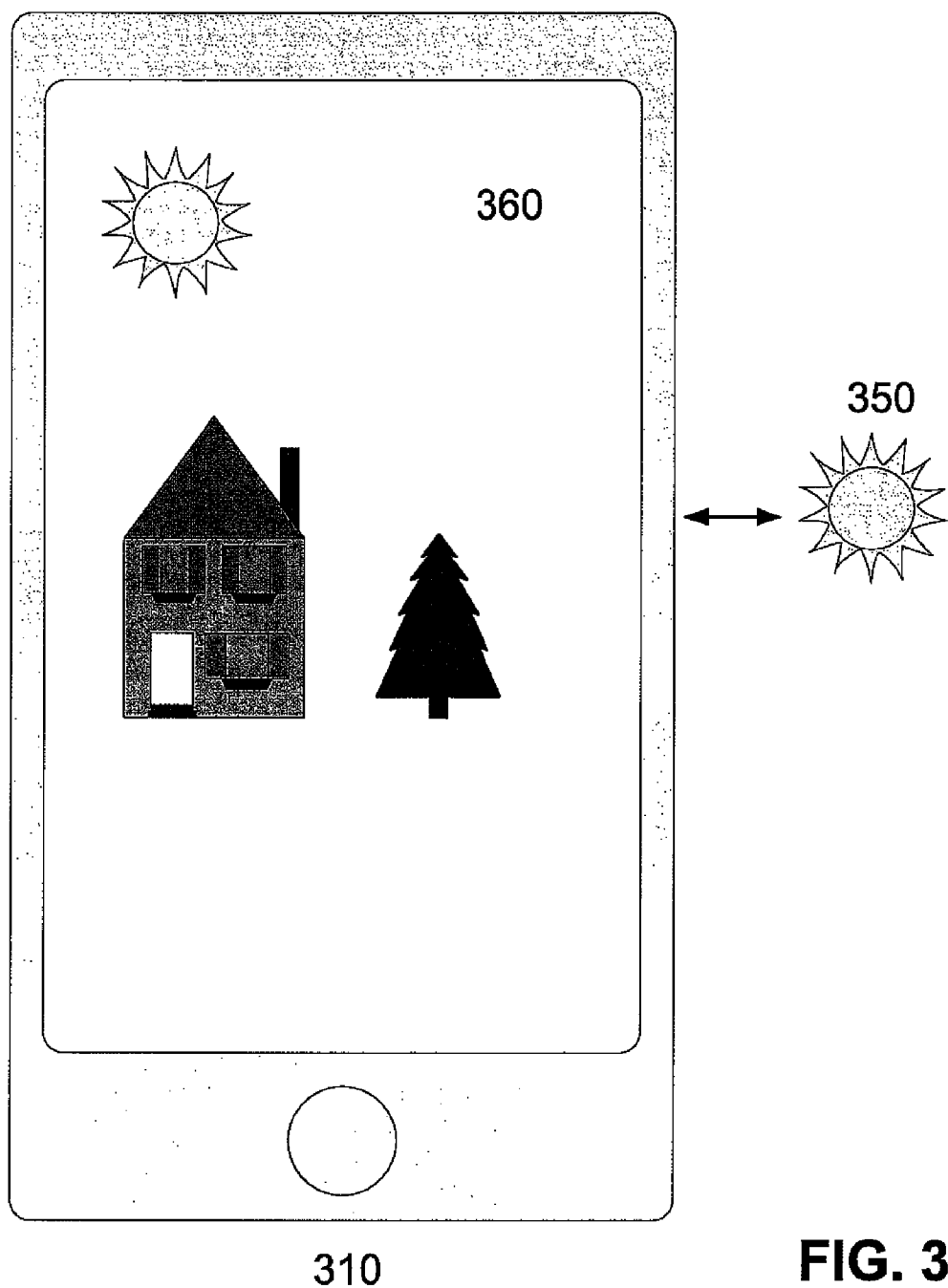
FIG. 3 illustrates an exemplary charm altering features of a mobile device, according to one implementation of the present disclosure.
Figure 4:
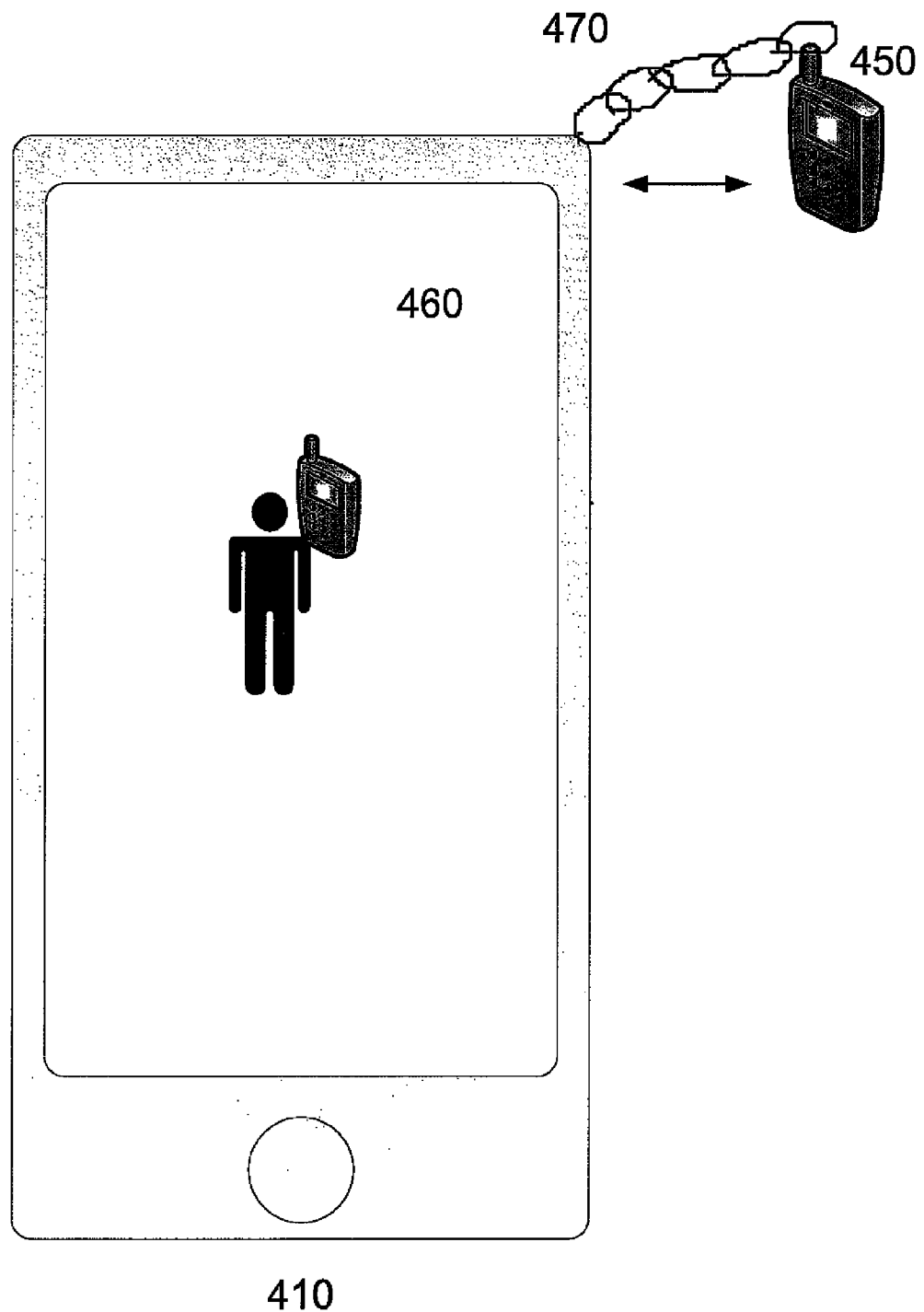
FIG. 4 illustrates an exemplary charm attached to a mobile device with a chain, according to one implementation of the present disclosure.

Moving now to FIGS. 3, 4, 5 and 6, these Figures include various implementations by which a charm, or a plurality of charms, may alter features of a mobile device while being in the proximity of the mobile device. FIG. 3 illustrates charm 350 altering the home screen display image 360 of mobile device 310, according to one implementation of the present disclosure. In FIG. 3, charm 350 is in the proximity of mobile device 310 enabling mobile device 310 and charm 350 to communicate. FIG. 4 illustrates charm 450 attached to mobile device 410 with chain 470 and altering the home screen display image of 460 of mobile device 410, according to one implementation of the present disclosure. Using chain 470 in FIG. 4 is merely for illustration purposes, as any object capable of attaching charm 450 to mobile device 410 may be used instead of chain 470.

Figure 5:
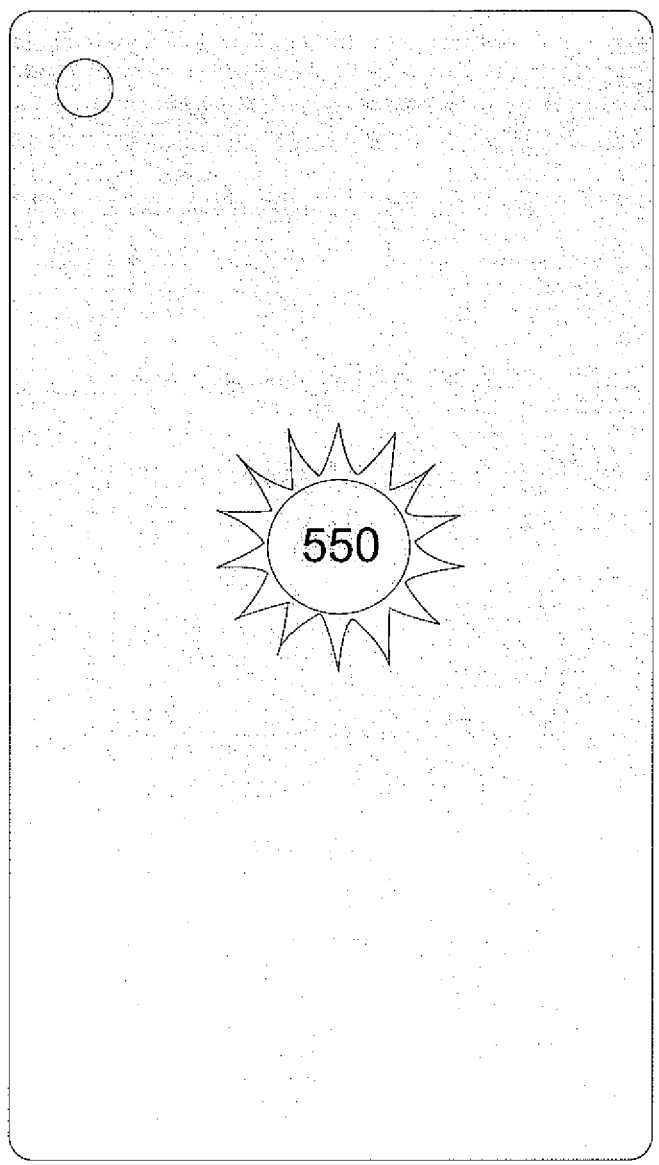
FIG. 5 illustrates an exemplary charm attached to the back of a mobile device, according to one implementation of the present disclosure.

For instance, rather than using a chain, FIG. 5 illustrates charm 550 being attached to the back of mobile device 510, according to one implementation of the present disclosure. In another implementation, mobile device 510 may be covered by a mobile device case with a housing in the back, which may partially or completely house charm 550. In such an implementation, charm 550 may have a rechargeable battery that is charged when charm 550 is placed in the housing of the mobile device case.

Figure 6:
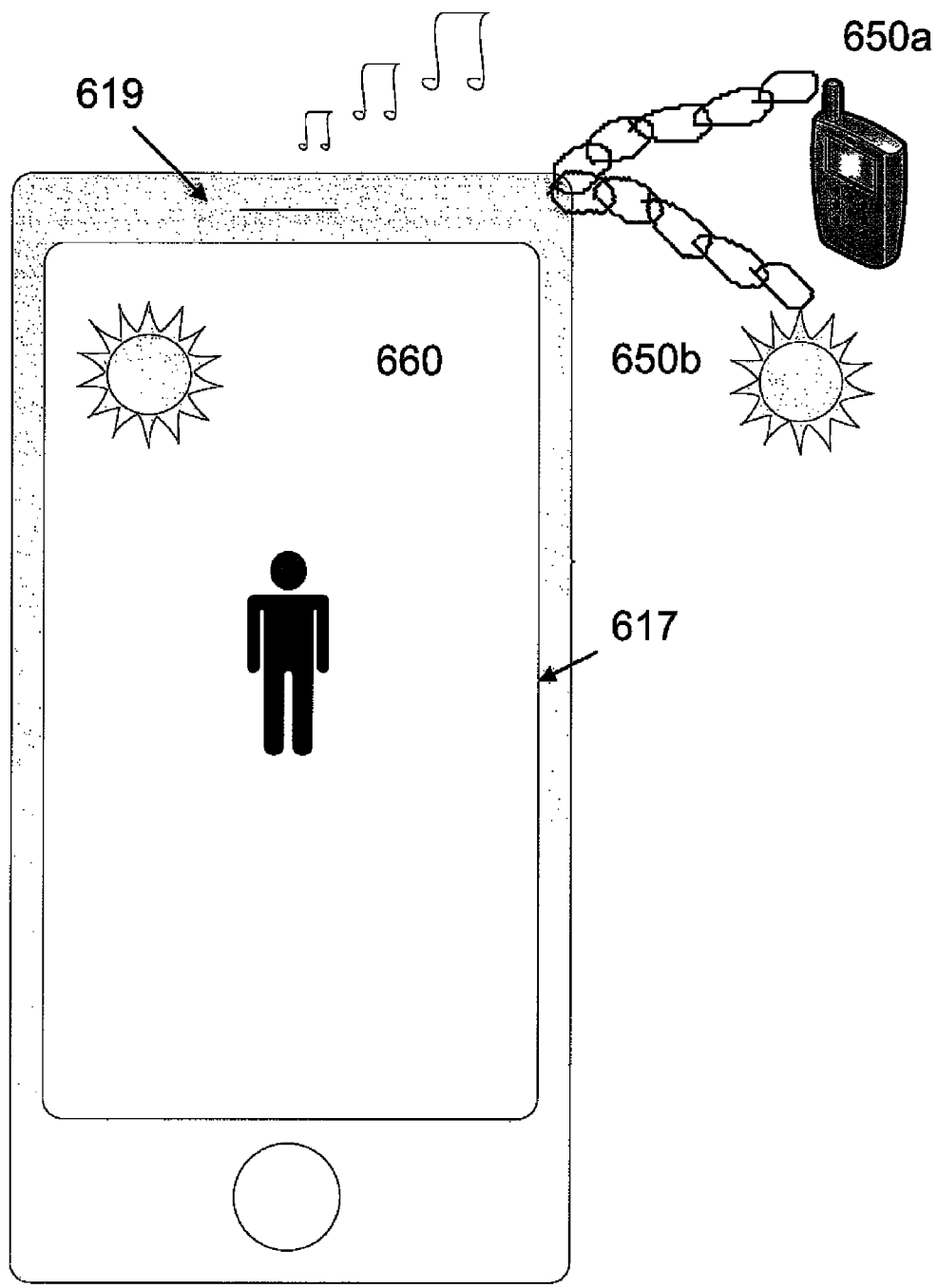
FIG. 6 illustrates an exemplary plurality of charms attached to a mobile device with chains, according to one implementation of the present disclosure.

FIG. 6 illustrates a plurality of charms, charm 650a and charm 650b, attached to mobile device 610 and altering various features of mobile device 610, according to one implementation of the present disclosure. As shown by FIG. 6, charm 650a is altering a ring tone of mobile device 610, while speaker 619 of mobile device 610 is playing the new ring tone. On the other hand, charm 650b is alerting the home screen display image 660 of mobile device 610, while display 617 of mobile device 610 is displaying the new home screen display image.

Although FIGS. 3, 4, and 6 show exact images of charms 350, 450, 650a for altering home screen display images 360, 460, and 660, in some implementations, an exact image of a charm may not be used. For instance, charm 350 might be a small toy or object in the form of a shining sun. However, a display image corresponding to charm 350 being used to alter home screen display image 360 may not be related to or include an image of a shining sun.

Figure 8A:
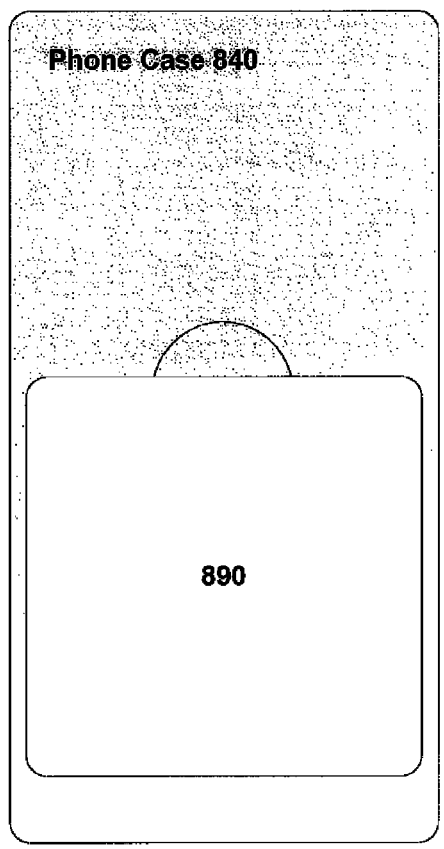
FIG. 8a illustrates an exemplary mobile device and a mobile device case having a moving element, according to one implementation of the present disclosure.
Figure 8B:
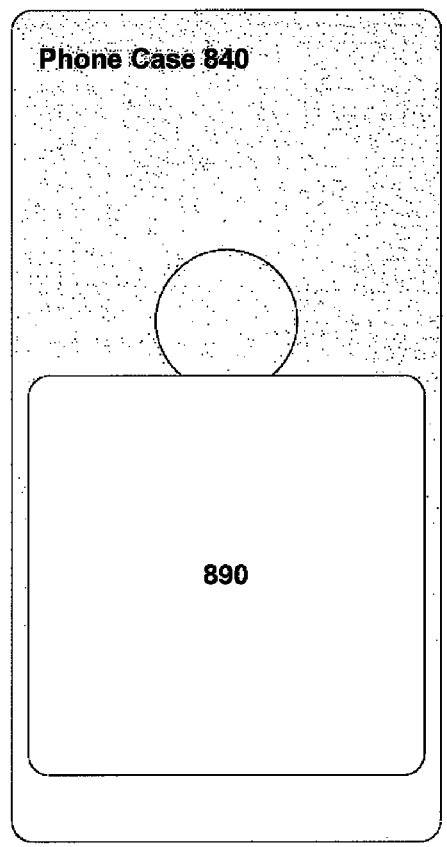
FIG. 8b illustrates an exemplary mobile device and a mobile device case having a moving element, according to one implementation of the present disclosure.

Moving now to FIGS. 7a, 7b, 8a and 8b, these figures illustrate a mobile device with a mobile device case, the mobile device case including a moving element, according to one implementation of the present invention. More specifically, FIGS. 7a and 7b show the individual elements of mobile device case 740a and mobile device case 740b while FIGS. 8a and 8b show a moving element moving as a result of interactions between mobile device 810 and mobile device case 840.

FIG. 7a shows the back of mobile device 710 with mobile device case 740a, moving element 750, motor 720, spring 760, wireless component 770, and battery 780, according to one implementation of the present invention. Moving element 750 may be any small object such as a small-sized plastic toy that can be attached to spring 760. Motor 720 may be any electromechanical motor capable of being configured to release spring 760 in response to receiving a signal from wireless component 770. Wireless component 770 may send a signal to motor 720 after receiving a wireless signal from mobile device 710. For instance, in one implementation, in response to receiving a call, mobile device 710 may be configured to send wireless component 770 a wireless signal. After receiving a wireless signal from mobile device 710, wireless component 770 may send a signal to motor 720 to move moving element 750.

Wireless component 770 may be any suitable device for communicating with mobile device 710. In one implementation, wireless component 770 may be a near field communication (NFC) transmitter, or a short distance radio transmitter. In another implementation, wireless component 770 may be a transceiver capable of receiving and transmitting wireless signals. As shown in FIG. 7a, wireless component 770 is connected to and in communication with motor 720 and motor 720 is connected to and in communication with spring 760. Wireless component 770 may be connected with motor 720 with a hardwire connection.

As shown in FIG. 7a, wireless component 770 and motor 720 may also be connected to battery 780. Battery 780 may be any rechargeable mobile device case battery for providing power to wireless component 770 and motor 720. In one implementation, rather than utilizing battery 780, mobile device case 740a may be connected to mobile device 710 via a hardwire connection and, therefore, draw power from the battery of mobile device 710 instead of external battery 780.

In FIG. 7b, motor 720, spring 760, wireless component 770, and battery 780 of mobile device 710 are present but invisible as they are covered by pouch 790 as a part of case 740b, according to one implementation of the present invention. Pouch 790 may be any type of material or object capable of holding moving element 750, motor 720, spring 760, wireless component 770, and battery 780. In one implementation, pouch 790 may come as a part of mobile device case 740b with motor 720, spring 760, wireless component 770, and battery 780, all embedded in pouch 790. In another implementation, pouch 790, with all the elements above, may come separately and not as a part of mobile device case 740b, in which case the pouch may later be attached to case 740b by a user.

Moving now to FIG. 8a, FIG. 8a illustrates that a spring inside or behind the pouch, corresponding to spring 760 of FIG. 7, has not been released and a moving element, corresponding to moving element 750 of FIG. 7, is in a default stationary position, according to one implementation of the present invention. On the other hand, FIG. 8b shows a state where the spring has been released and, thus, the moving element is jumping upwards, according to one implementation of the present invention.

Figure 9:
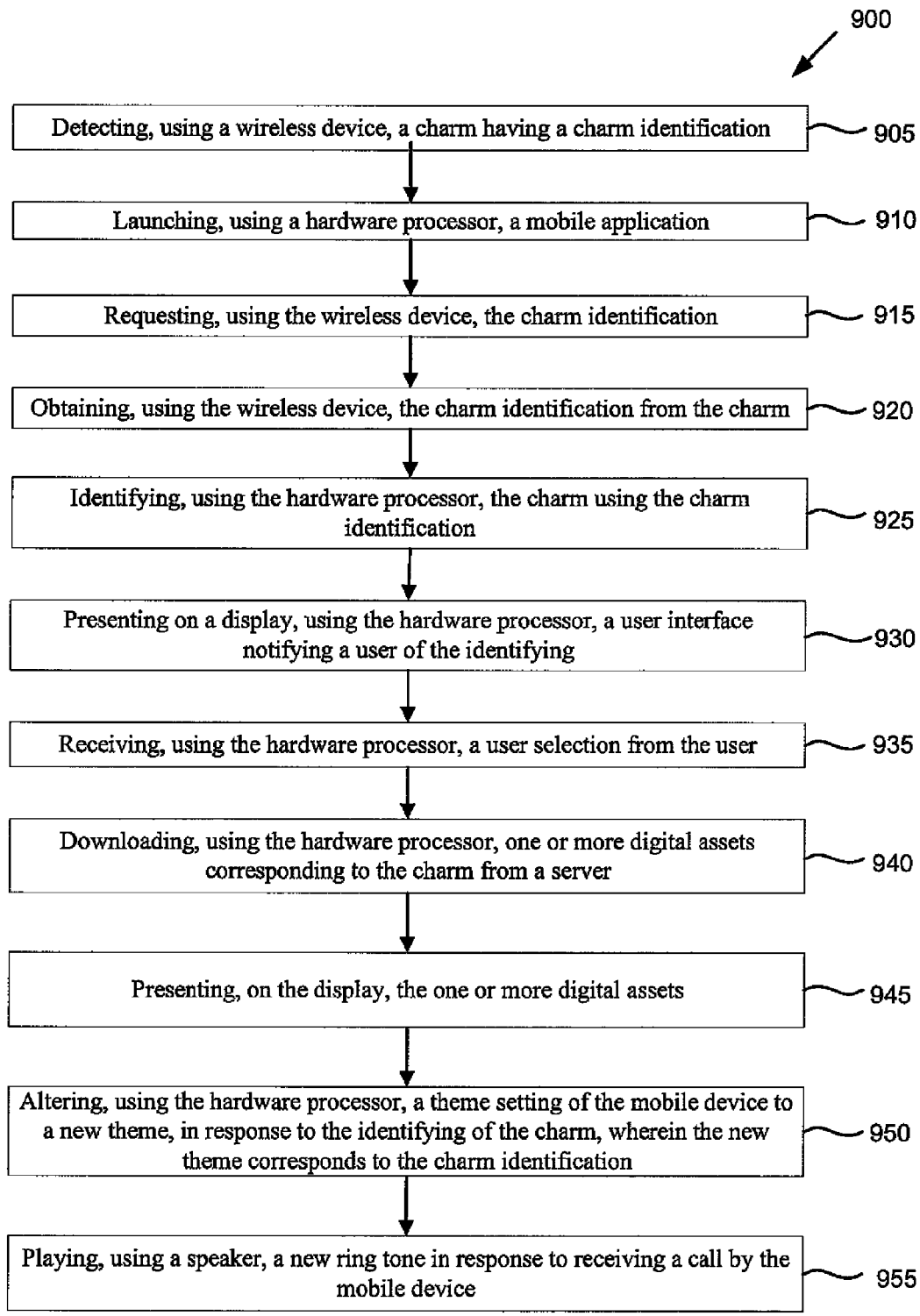
FIG. 9 shows an exemplary flowchart illustrating a method of altering features of a mobile device using a charm, according to one implementation of the present disclosure.

FIG. 9 illustrates flowchart 900 illustrating a method for using a charm to alter features of a mobile device, according to one implementation of the present disclosure. With respect to the method outlined in FIG. 9, it is noted that certain details and features have been left out of flowchart 900 in order not to obscure the discussion of the inventive features in the present application.

Flow chart 900 begins, at 905, with mobile device 210 detecting charm 250 having charm identification 256. The detecting is performed by wireless component 218 of mobile device 210, according to FIG. 2. Wireless component 218, capable of receiving wireless signals, may receive wireless signal 256 from charm 250 placed in the proximity of mobile device 210. Signal 256 may announce the presence of charm 250 to mobile device 210.

For mobile device 210 to detect the presence of charm 250, it is only necessary that charm 250 is in the proximity of mobile device 250, respectively. The magnitude of such proximity may depend on the types and capabilities of wireless component 218 and wireless component 254 used in mobile device 210 and charm 250. In some implementations, where a plurality of charms is in the proximity of mobile device 210, wireless component 218 may be configured to detect the most proximate or the closest charm.

At 910, mobile device 210 continues by launching mobile application 214 using processor 216. Mobile application 214 may be a charm application that user 220 downloads after purchasing charm 250. In one implementation, processor 216 may be configured to launch mobile application 214 in response to mobile device 210 detecting charm 250. Alternatively, in another implementation, mobile application 214 may already be in use prior to charm 250 being detected. In such an implementation, an operating system for mobile device 210 may notify mobile application 214 that charm 250 has been detected.

At 915, mobile application 214 proceeds with requesting charm identification 256 from wireless component 254 of charm 250, using wireless component 218 of mobile device 210. Charm 250 may contain a distinct charm identification 256 corresponding to charm 250, enabling mobile device 210 to identify charm 250. For instance, a charm in the form of a small piece of jewelry may have a charm identification that is different from the charm identification of a charm in the form of a toy car.

At 920, mobile device 210 continues by obtaining charm identification 256 corresponding to charm 250 from wireless component 254 of charm 250. In one implementation, wireless component 254 may be a passive RFID tag. In such an implementation, wireless component 218 of mobile device 210 may send wireless signals at predetermined time intervals to wireless component 254 of charm 250. In response to receiving a wireless signal from mobile device 210, wireless component 254 permits charm identification 256 to be read. In another implementation, wireless component 254 may be an active RFID tag. In such an implementation, charm 250 may have a battery providing power to wireless component 254, which can transmit charm identification 256 to wireless component 218 of mobile device 210, in response to receiving a request from mobile device 210.

In yet another implementation, wireless component 254 may be a Bluetooth transmitter connected to a button on charm 250. In such an implementation, when the button is pressed, wireless component 254 sends charm identification 256 to wireless component 218 of mobile device 210, which is actively searching for charm identification 256. In addition to wireless component 254 being a Bluetooth device, in one implementation, wireless component 218 of mobile device 210 may also be a Bluetooth device. In such an implementation, once the button is pressed, wireless component 254 is set to discoverable mode, where wireless component 254 starts announcing its present to other devices within its range. On the other hand, wireless component 218, which is in searching mode, finds wireless component 254 resulting in a Bluetooth paring of wireless component 218 of mobile device 210 and wireless component 254 of charm 250. Once wireless component 218 and wireless component 254 pair, wireless component 254 transmits charm identification 256 to wireless component 218 of mobile device 210.

At 925, mobile device 210 proceeds by identifying charm 250 using charm identification 256. The identifying, at 925, may be performed by mobile application 214 after mobile device 210 detects charm 250. In one implementation, mobile application 214 may have a database of charm identifications corresponding to a variety of charms available in the market. Accordingly, once charm identification 256 is obtained, mobile application 214 may conduct a search within its database to identify charm 250.

In another implementation, mobile application 214 may identify charm 250 by communicating with server 240 over network 230. In such an implementation, processor 216 may be configured to send charm identification 256 to server 240 to identify charm 250. In yet another implementation, charm 250 may include memory 252 containing data relating to charm 250 enabling mobile application 214 to identify charm 250 using information obtained from memory 252 as well as charm identification 256.

At 930, after identifying charm 250, mobile application 214 may be configured to present on display 217 a user interface for notifying user 220 that charm 250 has been identified. For instance, user 220 may receive a notification, alerting user 220 that: "Your shoe charm has been identified, would you like to proceed with altering features of your mobile device?" User 220 may then select to proceed with altering features of mobile device 210. In some implementations, mobile device 210 may detect and identify a plurality of charms. As shown in FIG. 6, more than one charm may be in the proximity of mobile device 210. In such implementations, after identifying the plurality of charms, mobile application 214 may be configured to present to user 220 a list of all identified charms on display 217. User 220 may then select one or more of the plurality of charms for altering features of mobile device 210.

At 935, mobile device 210 continues by receiving a user selection from user 220 to proceed with altering features of mobile 210. Alternatively, in some implementations, altering features of mobile device 210 might be performed automatically without receiving any user selection or input. Next, at 940, once user 220 selects charm 250 for altering features of mobile device 210, mobile application 214 may download digital assets corresponding to charm 250 for the altering. In one implementation, the digital assets may be stored in memory 212. In such an implementation, mobile application 214 may obtain digital assets corresponding to charm identification 256 from memory 212. In another implementation, digital assets may be stored in memory 252 of charm 250. In such an implementation, prior to or after identifying charm 250, digital assets stored in memory 252 may be transmitted to mobile device 210 using wireless component 254.

In yet another implementation, the digital assets may be downloaded from server 240. In such an implementation, processor 216 may send a request to server 240 to obtain the digital assets corresponding to charm 256 from server 240 over network 230. These digital assets include audio/visual content such as display images, ring tones, sound effects, and software code, implementation of which may alter features of mobile device 210.

At 945, prior to altering features of mobile device 210, mobile application 214 may present a user interface on display 217 enabling user 220 to select the features of mobile device 210 that user 220 wishes to alter using the downloaded digital assets. For instance, mobile application 214 may present a selection of digital assets including ring tones, display images, sound effects, and icons and ask user 220 to make a selection as to which features of mobile device 210 user 220 wishes to change using the presented digital assets.

At 950, mobile device 210 continues with altering features of mobile application 210 using the digital assets selected by user 220. In one implementation, altering features of mobile device 210 may include altering a theme of mobile device 210, such as ring tones, sound effects, alarm tones, and other customizable sound effects generated by mobile device 210. In another implementation, altering the theme may also include altering the look and feel of the user interface including, altering display settings of mobile device 210 to a new display image on, for example, the home and/or lock screens. Altering the look and feel of the user interface may also include altering formatting and colors associated with icons corresponding to mobile applications in the user interface of mobile device 210. In yet another implementation, various features within mobile application 214 may be altered. These features may include the look and feel of the user interface of mobile application 214 and unlockable content or items of various applications running on mobile device 210. Unlockable content refers to contents and items that become available in response to events or actions performed by a user. For instance, if mobile application 214 is a gaming application, possessing charm 250 may allow user 220 to play a new game or game level or provide user 220 with virtual accessories or objects, such as a sword or an extra life, within a virtual gaming environment provided by mobile application 214.

In addition to mobile application 214, various features within mobile applications other than mobile application 214 of mobile device 210 may be altered using charm 250. For instance, features of a text messaging application for mobile device 210 may be altered by charm 250. More specifically, if charm 250 is, for example, a star, then a digital image of the star may be added to the database of shapes and emoticons that user 220 may send to friends using the text messaging application.

In one implementation, rather than selecting only charm 250, user 220 may select a plurality of charms to alter features of mobile 210. In such an implementation, mobile application 214 may present a user interface, enabling user 220 to pick and choose digital assets corresponding to each of the plurality of charms for altering features of mobile device 210. For instance, as shown by FIG. 6, charm 650a may be toy in the form of a mobile device that corresponds to digital assets including a ring tone related to a motion picture sound effect. In addition, charm 650b may be a small toy in the form of a shining sun that corresponds to digital assets including a display image. User 220 may pick the ring tone corresponding to charm 650a to be the default ring tone of mobile device 210 and also pick the display image corresponding to charm 650b as the default display image for the home screen of mobile device 210. The user interface provided by mobile application 214 also allows user 220 to switch charm 250 with another charm. As user 220 switches charm 250 with another charm, mobile device 210 starts performing steps 905 to 945 again and presenting, using mobile application 214, a user interface enabling user to select the new charm for altering features of mobile device 210.

At 955, after altering features of mobile device 210, mobile device 210 continues by executing the altered features of mobile device 210. For instance, if a ring tone setting of mobile device 210 was altered to a new ring tone, then mobile device 210 continues by playing the new ring tone, using speaker 219, in response to receiving a call by mobile device 210. If, on the other hand, a display setting of mobile device 210 was altered to a new display image, then mobile device 210 continues displaying the new display image on display 217, in response to returning to a home screen.

Figure 10:
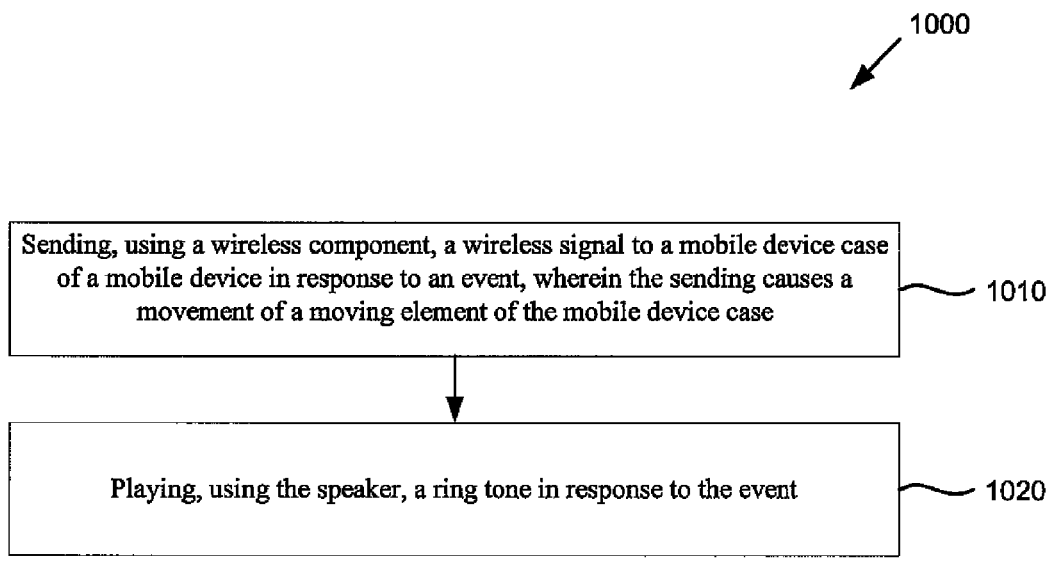
FIG. 10 shows an exemplary flowchart illustrating a method for use by a mobile device to move a moving element of a mobile device case, according to one implementation of the present disclosure.

FIG. 10 presents flowchart 1000 illustrating a method for using a mobile device to move a moving element of a mobile device case, according to one implementation of the present disclosure. With respect to the method outlined in FIG. 10, it is noted that certain details and features have been left out of flowchart 1000 in order not to obscure the discussion of the inventive features in the present application.

At 1010, flow chart 1000 begins with mobile device 710/810 sending wireless component 770 a wireless signal to activate motor 720 in response to a certain event. In some implementations, the event may include receiving a call, a text message, a push notification, an alarm going off, detecting a charm, or being in the vicinity of a certain location in an amusement park. In response to receiving a wireless signal, wireless component 770 activates motor 720 to release spring 760 resulting in movement by moving element 750. Moving element 750 may move in a variety of ways, including upwards, downwards and sideways. In one implementation, in addition to moving, moving element 750 may include an LED light that lights up in response to wireless component 770 receiving a wireless signal.

In one implementation, instead of using wireless component 770 and motor 720, mobile device case 740a might be connected to one end of a spring with the other end of the spring connected to moving element 750. In such an implementation, every time mobile device 710 vibrates as a result of receiving a call or other events causing mobile device 710 to vibrate, the spring shakes resulting in a movement in the moving element 750.

At 1020, when mobile device 710 receives a call, mobile device 710 may play a sound effect or a ring tone or display a certain image corresponding to moving element 750 in addition to causing moving element 750 to move. This is performed similar to the interactions between charm 250 and mobile device 210 described above. Here, mobile device 710 may detect and identify wireless component 770 corresponding to moving element 750. Then, various elements of mobile device 710 may be altered using digital assets corresponding to moving element 750.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a mobile device, the mobile device having a hardware processor and a wireless component having a wireless transceiver, the method comprising:
   detecting, using the wireless transceiver, a charm having a memory storing a charm identification;
   receiving, using the wireless transceiver, a wireless signal including the charm identification from the charm;
   identifying, using the hardware processor, the charm and a plurality of digital assets using the charm identification;
   obtaining, using the hardware processor, the plurality of digital assets corresponding to the charm, in response to the identifying;
   presenting, using the hardware processor, the plurality of digital assets corresponding to the charm on a user interface;
   receiving, using the hardware processor, a user selection of a first digital asset of the plurality of digital assets via the user interface; and
   changing, using the hardware processor, a current display theme of the mobile device to a new display theme, in response to receiving the user selection of the first digital asset, wherein the new display theme corresponds to the first digital asset.

2. The method of claim 1, further comprising:
   launching, using the hardware processor, a mobile application for use by a user in response to the detecting.

3. The method of claim 1, further comprising:
   requesting, using the wireless transceiver, the charm identification from the charm in response to the detecting.

4. The method of claim 1, further comprising:
   displaying on a display of the mobile device, using the hardware processor, the user interface notifying a user of the identifying.

5. The method of claim 1, wherein the changing the current display theme changes a home screen display image setting of the mobile device to a new home screen display image corresponding to the charm identification, and wherein the method further comprises presenting, using a display of the mobile device, the new home screen display image in response to returning to the home screen of the mobile device.

6. The method of claim 1, wherein the charm corresponds to a physical object having a second wireless component including one or more NFC chips.

7. The method of claim 1, wherein the mobile device is covered by a mobile device case, the mobile device case including a moving element, a spring, a motor, a battery, and a third wireless component.

8. The method of claim 7, further comprising:
   sending, using the wireless transceiver, a wireless signal to the mobile device case of the mobile device in response to an event, wherein the sending causes a movement of the moving element of the mobile device case.

9. The method of claim 1, wherein the changing the current display theme changes a ring tone setting of the mobile device to a new ring tone corresponding to the charm identification, and wherein the method further comprises playing, using a speaker of the mobile device, the new ring tone in response to receiving a call by the mobile device.

10. The method of claim 1, wherein the mobile device comprises a back side, a front side, and a display on the front side, and wherein the charm is attached to the mobile device using a chain or is attached to the back side of the mobile device.

11. A mobile device comprising:
    a wireless component having a wireless transceiver; and
    a hardware processor configured to:
      detect, using the wireless transceiver, a charm having a memory storing a charm identification;
      receive, using the wireless transceiver, a wireless signal including the charm identification from the charm;
      identify the charm and a plurality of digital assets using the charm identification;
      obtain the plurality of digital assets corresponding to the charm, in response to the identifying;
      present the plurality of digital assets corresponding to the charm on a user interface;
      receive a user selection of a first digital asset of the plurality of digital assets via the user interface; and
      change a current display theme of the mobile device to a new display theme, in response to receiving the user selection of the first digital asset, wherein the new display theme corresponds to the first digital asset.

12. The mobile device of claim 11, wherein the processor is further configured to:
    launch a mobile application for use by a user in response to detecting the charm.

13. The mobile device of claim 11, wherein the processor is further configured to:
    request, using the wireless transceiver, the charm identification from the charm in response to detecting the charm.

14. The mobile device of claim 11, wherein the processor is further configured to:
    display, on a display of the mobile device, the user interface notifying a user of identifying the charm.

15. The mobile device of claim 11, wherein the changing the current display theme changes a home screen display image setting of the mobile device to a new home screen display image corresponding to the charm identification, and wherein the hardware processor is configured to present, using a display of the mobile device, the new home screen display image in response to returning to the home screen of the mobile device.

16. The mobile device of claim 11, wherein the charm corresponds to a physical object including a second wireless component including one or more NFC chips.

17. The mobile device of claim 11, wherein the mobile device is covered by a mobile device case, the mobile device case including a moving element, a spring, a motor, a battery, and a third wireless component.

18. The mobile device of claim 17, wherein the processor is further configured to:
    send, using the wireless transceiver, a wireless signal to the mobile device case of the mobile device in response to an event, wherein the sending causes a movement of the moving element of the mobile device case.

19. The mobile device of claim 11, wherein the changing the current display theme changes a ring tone setting of the mobile device to a new ring tone corresponding to the charm identification, and wherein the hardware processor is configured to play, using a speaker of the mobile device, the new ring tone in response to receiving a call by the mobile device.

20. The mobile device of claim 11 further comprising:
a back side;
a front side; and
a display on the front side;
wherein the charm is attached to the mobile device using a chain or is attached to the back side of the mobile device.

* * * * *